(12) United States Patent
Kucharski et al.

(10) Patent No.: US 8,182,604 B2
(45) Date of Patent: May 22, 2012

(54) MICROBIAL BIOCEMENTATION

(75) Inventors: Edward S. Kucharski, Leeming (AU);
Ralf Cord-Ruwisch, Banjup (AU);
Vicky Whiffin, Delft (NL); Salwa M. Al-thawadi, Manama (BH)

(73) Assignees: Murdoch University, Murdoch (AU);
Calcite Technology Pty Ltd, Osborne Park (AU)

( * ) Notice: Subject to any disclaimer, the term of this patent is extended or adjusted under 35 U.S.C. 154(b) by 888 days.

(21) Appl. No.: 11/793,555

(22) PCT Filed: Dec. 20, 2005

(86) PCT No.: PCT/AU2005/001927
§ 371 (c)(1),
(2), (4) Date: Apr. 24, 2008

(87) PCT Pub. No.: WO2006/066326
PCT Pub. Date: Jun. 29, 2006

(65) Prior Publication Data
US 2008/0245272 A1 Oct. 9, 2008

(30) Foreign Application Priority Data

Dec. 20, 2004 (AU) .................. 2004907195

(51) Int. Cl.
*C04B 14/04* (2006.01)
*C04B 14/00* (2006.01)
*C04B 24/00* (2006.01)
*C04B 7/00* (2006.01)
*C04B 16/00* (2006.01)
*C09C 1/02* (2006.01)
*C12P 1/04* (2006.01)

(52) U.S. Cl. ........ 106/638; 106/471; 106/724; 106/727; 106/808; 106/738; 106/491; 435/170

(58) Field of Classification Search ................ None
See application file for complete search history.

(56) References Cited

U.S. PATENT DOCUMENTS
2005/0029187 A1   2/2005   Koga et al.

FOREIGN PATENT DOCUMENTS
JP   08-169745   7/1996

OTHER PUBLICATIONS

Day, Jeremy L.; Ramakrishnan, V.; Bang, Sookie S.. Microbiologically Induced Sealant for Concrete Crack Remediation [online]. Jun. 25, 2004 [Retrieved on Jan. 10, 2011]. Retrieved from the Internet [http://replay.waybackmachine.org/20040625024852/http://www.ce.washington.edu/em03/proceedings/papers/352.pdf].*

(Continued)

*Primary Examiner* — Anthony J Green
*Assistant Examiner* — Karam Hijji
(74) *Attorney, Agent, or Firm* — Marshall, Gerstein & Borun LLP

(57) ABSTRACT

A method of forming a high strength cement in a permeable starting material, the method comprising the step of combining the starting material with effective amounts of (i) a urease producing micro-organism; (ii) urea; and (iii) calcium ions and wherein the effective amount of the urease producing organism provides a urea hydrolysis rate, under standard conditions, of 0.5-50 mM urea hydrolysed.min−1.

21 Claims, 12 Drawing Sheets

OTHER PUBLICATIONS

Whiffin, Victoria S.. "Microbial CaCO3 Precipitation for the production of Biocement". Sep. 2004 [Retrieved Jan. 13, 2011]. Retrieved from the Internet [http://liveweb.waybackmachine.org/http://researchrepository.murdoch.edu.au/399/2/02Whole.pdf].*

Ramachandran, Santhosh K.; Ramakrishnan, V.; Bang, Sookie S. "Remediation of Concrete Using micro-Organisms". ACI Materials Journal. Jan. 2001 [Retrieved on Jun. 10, 2011].*

Ciurli, S.; Marzadori, C.; Benini, S.; Deiana, S.; Gessa C. "Urease from the Soil Bacterium *Bacillus pasteurii*: Immobilization on Ca-Polygalacturonate" Soil Boil. Biochem.; vol. 28, No. 6; pp. 811-817. 1996 [Retrieved on Jun. 10, 2011].*

Ramakrishnan, V.; Bang, Sookie S.; Galinat, J. "Calcite precipitation induced by polyurethane-immobilized *Bacillus pasteurii*". Enzyme and Microbial Technology. vol. 28; pp. 404-409. 2001 [Retrieved on Jun. 13, 2011].*

Day, Jeremy L.; Ramakrishnan, V.; Bang, Sookie S.. Microbiologically Induced Sealant for Concrete Crack Remediation [online]. Jun. 25, 2004 [Retrieved on Jan. 10, 2011]. Retrieved from the Internet [http://replay.waybackmachine.org/20040625024852/http://www.ce.washington.edu/em03/proceedings/papers/352.pdf.*

McNally, "Estimation of Coal Measures Rock Strength Using Sonic and Neutron Logs," Geoexploration 24:381-395 (1987).

"Soil Carbonates" Chapter 19—Australian Laboratory Handbook of Soil and Water Chemical Methods, by G.E. Rayment and F.R. Higginson, Inkata Press, Sydney, 1992, pp. 206-210.

International Search Report from PCT/AU2005/001927.

International Preliminary Report on Patentability from PCT/AU2005/001927.

* cited by examiner

MICROBIAL BIOCEMENTATION

FIELD OF THE INVENTION

The present invention relates to a method for forming high strength cement utilising a microbial source of urease such as bacteria that are capable of producing urease. The present invention also relates to various applications of the cement formed by the method.

BACKGROUND ART

Urease producing bacteria have been used to remediate the surface and subsurface of permeable media. This process, also known as mineral plugging, has been used in the oil industry where the decreased permeability and porosity of treated media reduces fluid flow and thus can enhance the recovery of oil from reservoirs and/or limit the spread of contaminants from a spill site.

Mineral plugs form as a result of precipitation caused by the increase in pH, which itself is a result of the ammonia formed as a product of the enzymatic breakdown of urea by the urease enzyme. However, whilst these plugs have been used to reduce the porosity/permeability of fissures and other cracks in geological formations, the resulting cement is not strong enough for a range of other applications. Furthermore, the degree of control of the process used to form mineral plugs is limited meaning that results are inconsistent and there are many applications where the method is simply not viable.

Conventional cement is used for a variety of structural applications However, because conventional cement is applied as a fairly thick slurry, it is not adapted for spray application nor is it particularly useful for applications where it is necessary or desirable to form the cement at or below a surface or retain the porosity of the cemented material.

The present invention seeks to address the limitations described above by providing a method for forming a high strength cement using urease producing micro-organisms and defined amounts of other reagents. The present invention also seeks to provide various uses of the high strength cement.

SUMMARY OF THE INVENTION

The present invention provides a method of forming a high strength cement in a permeable starting material, the method comprising the step of combining the starting material with effective amounts of (i) a urease producing micro-organism; (ii) urea; and (iii) calcium ions and wherein the effective amount of the urease producing organism provides a urea hydrolysis rate, under standard conditions, of 0.5-50 mM urea hydrolysed.min$^{-1}$.

The method of the present invention can form high strength cement through the production of relatively high levels of calcite in the starting material. Thus, the present invention also provides a method of forming a high strength cement in a permeable starting material, the method comprising the step of combining the starting material with effective amounts of (i) a urease producing micro-organism; (ii) urea; and (iii) calcium ions and wherein the cement results from the formation of at least 33 g of calcite per litre of material added to the starting material.

The method of the present invention is amenable to repeated application of reagents. Thus, the present invention also provides a method of forming a high strength cement in a permeable starting material, the method comprising the steps of:

(a) combining the starting material with effective amounts of (i) a urease producing micro-organism; (ii) urea; and (iii) calcium ions; and (b) adding further amounts of at least one of the reactants (i) to (iii);

wherein the effective amount of the urease producing organism provides a urea hydrolysis rate, under standard conditions, of 0.5-50 mM urea hydrolysed.min$^{-1}$.

One of the advantages of the present invention is that it may be applied without unnecessary disruption or disturbance of the starting material. Thus, the present invention also provides an in situ method of forming a high strength cement in a permeable starting material, the method comprising the step of combining the starting material with effective amounts of (i) a urease producing micro-organism; (ii) urea; and (iii) calcium ions and wherein the effective amount of the urease producing organism provides a urea hydrolysis rate, under standard conditions, of 0.5-50 mM urea hydrolysed.min$^{-1}$.

Another aspect of the present invention is a cement formed using the method of the present invention. Thus, the present invention also provides a cement formed by a method described herein and wherein the cement contains bacterial cells and has a strength of at least 0.05-5 MPa.

The present invention may be applied to produce cement for use in applications in civil engineering, mining, erosion control, environmental and the manufacture of special materials. Ground improvement applications are particularly suited for the present invention. Civil engineering applications include application of the method to retaining walls, embankments (e.g. railway embankments, dams) and ground for tunnelling to reinforce and stabilise soil; foundations to improve skin friction of piles (bonding them to the "far field"); increasing the end-bearing capacity of piles; stiffening in situ formation to reduce pile design lengths; improving the bearing capacity of soils for non-piled foundations; and the stabilisation of sands in earthquake zones at risk of liquefaction.

The method of the present invention may also be used in pavements to create "instant" pavements by surface treatment of natural or prepared sand surfaces for roads, runways etc and to rapidly repair degraded pavement sub base.

The method of the present invention may also be used to preserve, restore, strengthen and protect weathered mortar and masonry in buildings such as heritage structures; consolidate and conserve decaying lime plasters in mural paintings; create architectural features in gardens and replicate ornaments in synthetic sandstone/limestone.

Uses in the mining industry include the use of the method to provide support to broken ground during tunnelling and mining; strengthen tailings dams to prevent erosion and slope failure; provide a permeable reactive barrier to allow drainage and remove acidic and heavy metal discharges from mines; bind dust particles on exposed surfaces to reduce dust levels; increase resistance to petroleum borehole degradation during drilling and extraction; increase the resistance of offshore structures to erosion of sediment within or beneath gravity foundations and pipelines.

The method of the present invention also has environmental applications such as the stabilisation and removal of pollutants (e.g. heavy metals, fibres, radioactive elements) from the environment by binding them into the calcite crystal structures and the control of erosion in coastal area and rivers by strengthening exposed surfaces and thus protecting areas subject to erosion.

Other uses of the method include the creation of filters such as water filters and bore hole filters, and the immobilisation of bacterial cells and their enzymes into a cemented active biofilter.

DETAILED DESCRIPTION OF THE INVENTION

Method of Producing High Strength Cement

Figure 1:
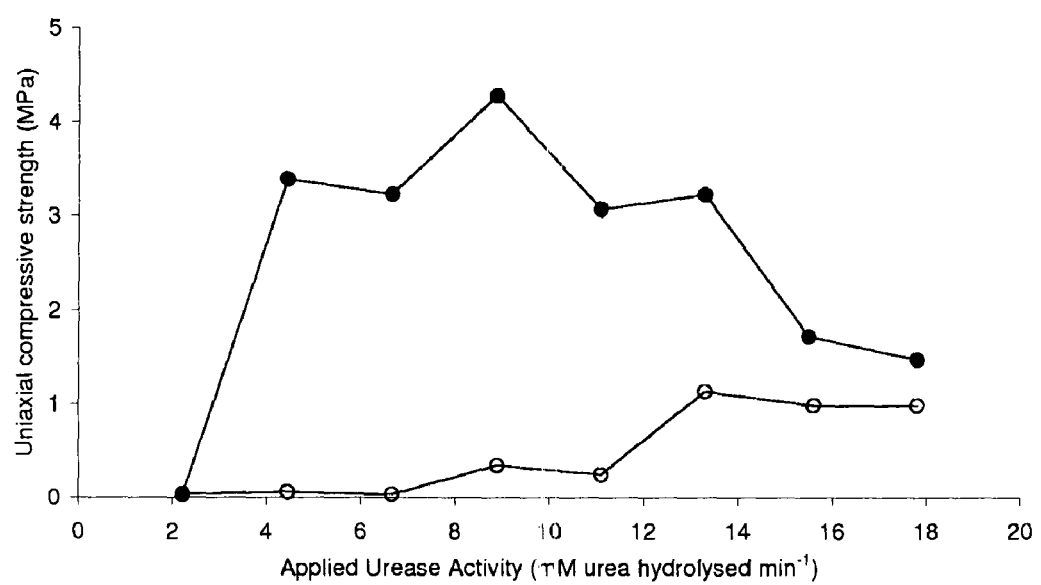
FIG. 1 is a graph illustrating the uniaxial compressive strength recorded over the entire 90 mm core length for first (○) and second (●) treatments with 1.5 M equimolar urea and calcium solution, after 24 hours.

A method of forming a high strength cement in a permeable starting material, the method comprising the step of combining the starting material with effective amounts of (i) a urease producing micro-organism; (ii) urea; and (iii) calcium ions and wherein the effective amount of the urease producing organism provides a urea hydrolysis rate, under standard conditions, of 0.5-50 mM urea hydrolysed.min$^{-1}$. For the purposes of the present invention the term "cement" refers to precipitated substance that binds particulate material, such as rock or sand, together.

For the purposes of the present invention the term "high strength cement" refers to a cement that:
(i) results from the application of a urease producing micro-organism that provides a urea hydrolysis rate, under standard conditions, of 0.5-50 mM urea hydrolysed.min$^{-1}$; or
(ii) results from the formation of at least 33 g of calcite per litre of material added to the starting material.

There are a number of techniques used to determine the calcite or carbonate content of material. One method measures the amount of carbon dioxide gas that is evolved when the material is treated with acid. The quantity of carbon dioxide evolved can be determined by either measuring gas pressure (manometric method) or gas volume changes. Knowing the mass of sample and volume of gas, the quantity of carbonate present can be calculated. Twp specific techniques for measuring calcite content can be found in Chapter 19—"Soil Carbonates" in "Australian Laboratory Handbook of Soil and Water Chemical Methods", by G. E Rayment and F. R. Higginson, Inkata Press, Sydney, 1992, pages 206-210.

Preferably, the high strength cement also has:
(i) a uniaxial compressive strength of at least 0.05 to 0.5 MPa/(mM urea hydrolysed.min$^{-1}$) wherein, preferably, strength is determined by assessing the velocity of ultrasound waves sent through the material; and/or
(ii) has uniaxial compressive strength of at least 0.05 to 5 MPa or 2 to 5 MPa, wherein, preferably, strength is determined by assessing the velocity of ultrasound waves sent through the material; and/or
(iii) has a calcite content of at least 1-5%.

Ultrasonic velocity measurements and compressive strength measurements such as UCS can be performed using commercially available equipment or through specialist engineering laboratories. Generally, the relationship between ultrasonic velocity and UCS has to be established for each type of material (or soil) that is being treated. One technique involves the following steps: (i) prepare a number of cylindrical core samples with differing degrees of cementation (and strength) of the material that is being treated, (ii) measure the ultrasonic velocities through each of treated material cores (a non-destructive technique), (iii) measure the UCS values for each treated core by crushing them in a UCS press to obtain their failure point—i.e. the pressure taken break them (a destructive technique), and (iv) calculating the relationship between the two measurements using an equation such as the one used by McNally, G. H. 1987. Estimation of coal measures rock strength using sonic and neutron logs. Geoexploration 24:381-395. but recalculating the two constants to be applicable for a given material type.

For the purposes of the present invention the term "permeable" means the starting material enables the sufficient passage of a solution of at least one of (i) a urease producing micro-organism; (ii) urea; and (iii) calcium ions to enable the formation of the high strength cement.

It will be appreciated that the step of "combining" the starting material with effective amounts of (i) urease in the form of a urease producing micro-organism; (ii) urea; and (iii) calcium ions covers any process that results in the bringing together of the three constituents in a manner that results in the formation of the high strength cement in the starting material. For example, there may be applications where one or two of the constituents are already present in the starting material, in which case the step of "combining" will involve the addition of only the missing constituents. Preferably, the urea and calcium ions are admixed and then added to the urease producing micro-organism prior to application to the starting material. However, it will be appreciated that the constituents may be combined in other ways to carry out the method of the invention.

The present invention is based on the surprising discovery that high strength cement can be formed in permeable starting material by reacting particular amounts of the micro-organism, urea and calcium ions. In particular, applicants have found that amounts of the micro organism that deliver large urease activity levels, relative to other cementation techniques utilising bacteria as a source of urea, are particularly useful. The relatively large amounts of reactants used in the method of the present invention enables large amounts of calcite to be produced. In this regard, when provided in particular amounts the reactants combine in a manner that results in the formation of a high strength cement disposed within and/or upon the starting material. This outcome is particularly surprising as the amounts of the reagents such as urea and calcium ions used would be expected to be inhibitory and/or toxic to the urease producing micro-organism to the extent that little or no calcite would be produced.

Importantly, by manipulating the relative effective amounts of the various constituents, the method of the present invention enables the user to control cementation by controlling the amount of calcite formed and the rate at which it is formed. This flexibility means the method of the present invention can be used in a wide range of applications from those that require a reasonably modest strength increase in the starting material to those that require larger increases.

Thus, the present invention also provides a method of forming a high strength cement in a permeable starting material, the method comprising the step of combining the starting material with effective amounts of (i) a urease producing micro-organism; (ii) urea; and (iii) calcium ions and wherein the cement results from the formation of at least 33 g of calcite per litre of material added to the starting material.

The cement may result from the formation of at least 22-32 g of calcite per litre of material added to the starting material. Alternatively, the cement may result from the formation of at least 33-75 g or 40-75 g of calcite per litre of material added to the starting material.

Whilst not wishing to be bound by any particular mode of action, the high strength cement obtained using the method of the present invention is believed to be a result of the amount and nature of the calcite crystal formation in the starting material that in turn affects the strength of the resulting cement. It is also believed that the presence and amount of biomass of the micro-organism used in the method may also affect calcite crystal formation and this may also affect the strength of the resulting cement.

The effective amounts of the various reactants combined according to the method of the present invention may vary depending, at least, on the micro-organism's urease producing capabilities, the characteristics of the permeable starting material and the conditions under which cementation is to occur, the desired final strength of the cement and the amounts of the other reactants in the reaction mix. The information in the present specification enables a skilled person to routinely determine the relative amounts of the various reactants required for a given application and thus provides a skilled person with all that is required to apply the method to various starting materials and for a variety of end uses.

Depending on the requirements of a particular application or mode of use of the present invention, rapid formation of the cement may be required. For the purposes of the present invention rapid formation means that the starting material reaches at least about 60%-90% of its final strength within about 1-6 hours after application of the method. More preferably the starting material reaches at least about 60%-90% of its final strength within about 2-5 hours and even more preferably the starting material reaches at least about 60%-90% of its final strength within about 3-4 hours of application of the method.

Alternatively it may be preferred, for the cement to be formed slowly. For the purposes of the present invention slow formation means that the starting material reaches at least about 60%-90% of its final strength about 1-6 weeks after application of the method. More preferably the starting material reaches at least about 60%-90% of its final strength about 2-5 weeks and even more preferably the starting material reaches at least about 60%-90% of its final strength about 3-4 weeks of application of the method.

The method of the present invention may be adapted to allow for the rate of cement formation to be controlled, as required. When rapid formation of the cement is desired the amounts and/or relative amounts of the reagents can be selected accordingly to bring about rapid formation.

When rapid formation is desired, the effective amount of the urease producing micro-organism may be the amount required to provide a urea hydrolysis rate, under standard conditions, of 0.5-50 mM urea hydrolysed.min$^{-1}$, more preferably 1-25 mM urea hydrolysed.min$^{-1}$, even more preferably 2-20 mM urea hydrolysed.min$^{-1}$, and even more preferably 4-18 mM urea hydrolysed.min$^{-1}$. In one particular form of the invention the effective amount of the urease producing micro-organism is the amount required to provide a urea hydrolysis rate, under standard conditions of 2.2-13.3 mM urea hydrolysed.min$^{-1}$. For the purposes of the present invention "standard conditions" are 1.5M urea and 25° C.

When rapid formation of the cement is desired, the effective amount of urea will depend on the amount of the other reagents and will be enough to ensure the formation of the high strength cement. Preferably, the effective amount of urea is to a final concentration of at least 100-200 mM, more preferably at least 200-300 mM and even more preferably at least 300-1500 mM. In one particular form of the invention the effective amount of the urea is to a final concentration of at least 350 mM, 1500 mM or 2000 mM.

When rapid formation of the cement is desired, the effective amount of calcium ions will depend on the amount of the other reagents and will be enough to ensure the formation of the high strength cement. Preferably, the effective amount of calcium ions is to a final concentration of at least 50-200 mM, more preferably at least 200-500 mM and even more preferably at least 500-1500 mM. In one particular form of the invention the effective amount of the calcium ions is to a final concentration of at least 100 mM, 1500 mM or 2000 mM.

When slow formation of the cement is desired, this can be achieved by controlling the amounts of at least one of the reagents. Preferably, at least one of the reagents is added over time in amounts that are less than the amount required for rapid formation of the cement but when taken together are sufficient to result in the formation of high strength cement, albeit over a longer period of time. In one form of the invention the reagent that is added over time is the urease producing micro-organism. Alternatively, all three of the of the reagents may be added over time in amounts that are less than the amount required for rapid formation of the cement but when taken together are sufficient to result in the formation of high strength cement, albeit over a longer period of time. However, when adding all the reagents over time, it must be appreciated that the relative amounts of the reagents may need to be varied. The scaling down is not linear due to reduced inhibition of the urease by the $Ca^{2+}$ and the enhanced urease rate due to the urea. So to avoid forming the cement (calcite) too fast, the urease producing micro-organism needs to be added at an amount less than the calcium ions and urea, relatively speaking. The amounts of the reagents used to achieve slow formation are able to be routinely determined by one of skill in the art using the information contained herein.

The urease producing micro-organism can be varied provided it is capable of supplying the required urease activity. For economic reasons it is preferred that the micro-organism be readily culturable, preferably under non-sterile conditions and with the use of relatively inexpensive media. The micro-organism may be a prokaryote such as a bacterium. However, it may also be a unicellular eukaryote such as a fungus, yeast, plant or animal cell provided the cell is capable of providing the required urease.

Preferably, the micro-organism is adapted to survive and/or grow under at least one of the following conditions: (i) relatively high urea concentrations such as the effective amounts of urea described herein; (ii) relatively high calcium ion concentrations such as the effective amounts of calcium ions described herein; (iii) basic pH's of at least 7.5 such as 7.5-10; and (iv) relatively high temperatures of at least 30° C.

The micro-organism used in the method of the present invention may be naturally capable of producing urease and/or have one or more characteristics that render it particularly useful for use in the method of the present invention. Alternatively, it may be a micro-organism that has been genetically modified or engineered to render it capable of producing urease and/or have one or more characteristics that render it useful for the method of the present invention.

Preferably, the micro-organism is a bacterium from the Bacillacae family and more particularly from a genus selected from the list of genera comprising: *Bacillus, Sporosarcina, Sporolactobacillus, Clostridium* and *Desulfotomaculum*. Even more preferably the micro-organism is *Sporosarcina pasteurii* or a functional equivalent thereof.

Functional equivalents of *Sporosarcina pasteurii* are those bacteria with at least one characteristic in common with *Sporosarcina pasteurii* that render them useful for the method of the present invention. A person skilled in the art could routinely identify such bacteria. Of course a combination of different micro-organisms can be used if desired.

The urea may be provided in various forms. Preferably, the urea is provided as an aqueous solution in water.

The calcium ions may be provided in various forms. The calcium ions may be provided in the form of a salt such as calcium nitrate or calcium chloride. Preferably, the calcium ions are provided as a mixture of calcium salts to prevent or reduce inhibitory effects caused by high concentrations of particular anions. In one particular form of the invention the calcium ions are provided in the form of a mixture of at least two salts such as calcium nitrate and calcium chloride. The mixture of salts may be provided in various ratios. However, a 50:50 mixture of calcium nitrate and calcium chloride is preferred.

The starting material may be varied provided it is permeable. Preferably, the starting material has a particulate structure. When the starting material is rock it may be a sedimentary rock such as a terrigenous, chemical/biochemical or organic sedimentary rock selected from the group of sedimentary rocks comprising: conglomerate, breccia, sandstone, siltstone, shale, limestone, gypsum, dolostone, peat and lignite. Alternatively, the starting material may be unconsolidated or partially consolidated particulate material such as sand, soil, clay, sediments, sawdust or other material that is amenable to in situ cementation. Other starting materials include cardboard, particle board and soft woods. It will be appreciated that the properties of the starting material e.g. its composition, its particle size distribution and % voids in the material also affect the manner in which the method of the invention is applied.

The manner in which the reactants are combined may be varied as required. The micro-organism, urea and calcium ions may be combined together and then applied to the starting material. Thus, the present invention also provides a method of forming a high strength cement in a permeable starting material, the method comprising the steps of (a) premixing effective amounts of (i) a urease producing micro-organism; (ii) urea; and (iii) calcium ions and (b) combining the mixture from (a) with the starting material.

The reactants may also be added to the starting material simultaneously or sequentially. For example, the micro-organism can be applied to the starting material followed by the urea and calcium ions that can be added separately or premixed prior to addition to the starting material. In another form of the invention the urea and calcium ions can be added to the starting material followed by the micro-organism that can be added sequentially or simultaneously.

The reactants may be applied to the starting material in a variety of ways. The reactants may be forced into the starting material under pressure such as by flushing or injection; sprayed, dripped or trickled onto or into the starting material. Alternatively, depending on the size and form of the starting material it may be immersed in the reactants.

The method of the invention may also be repeated in order to attain the necessary high strength cement. Thus, the present invention also provides a method of forming a high strength cement in a permeable starting material, the method comprising the step of combining the starting material with effective amounts of (i) a urease producing micro-organism; (ii) urea; and (iii) calcium ions and wherein the step is repeated at least once.

It will be appreciated that when the method is repeated to gain incremental increases in strength, not all of the reagents need to be added each time. For example, residual urease activity provided by micro-organisms that were added in the first application, may still be sufficient to provide sufficient urease activity for the subsequent rounds of the method. A skilled person is readily able to determine the particular amounts of reagents required for use in subsequent rounds of the method of the present invention.

Loss of micro-organisms after their addition to the starting material (by rinsing etc) can reduce the efficiency of the method. This problem can be particularly associated with the use of non-flocculating micro-organisms. Wastage of the urease producing micro-organisms that may be lost from the starting material without contributing to the cementation process can be minimised by fixing the micro-organisms in the starting material prior to cementation. Fixing the micro-organisms in the starting material is also preferred when the high strength cement is to be formed with multiple applications of reagents as less micro-organisms are needed in the subsequent applications. Thus, the present invention also provides a method of forming a high strength cement in a permeable starting material, the method comprising the steps of (i) applying the micro-organism to the starting material; (ii) fixing the micro-organisms in the starting material; and (iii) combining the starting material incorporating the fixed micro-organisms with effective amounts of urea and calcium ions.

Preferably, the micro-organisms are fixed in the starting material using an effective amount of calcium ions. The effective amount may be varied but is preferably about 10-50 mM. Whilst the applicants do not wish to be bound by any particular mode of action, they believe the calcium ions come into contact with the micro-organisms which excrete low concentrations of carbonate that results in the formation of calcium carbonate on the cell surface. The calcium carbonate may act to bond the cells to the starting material or cause the micro-organisms to be more firmly retained in the starting material by other means.

Importantly, the method of the present invention may be applied in situ without disturbing the starting material. This is particularly important for applications where it is important that the starting material is delicate or fragile or for other reasons must not be disturbed. For example, when applied in the field for ground improvement purposes it may be particularly important to retain one or more existing features of the starting material such as the soil structure and layers that exist in the starting material.

Depending on the starting material and the various conditions under which the high strength cement may be formed it may be necessary to apply one or more of the reactants to the starting material more than once. Thus, the present invention also provides a method of forming a high strength cement in a permeable starting material, the method comprising combining the starting material with effective amounts of (i) a urease producing micro-organism; (ii) urea; and (iii) calcium ions wherein at least one of the reactants (i) to (iii) are applied more than once.

Preferably, the urea and the calcium ions are applied more than once. In this regard, upon application, the micro-organism may persist in the permeable starting material in a manner than enables it to react with additional urea and calcium ions and cause the formation of additional cement thus conferring added strength to the starting material.

Uses

The method of forming high strength cement according to the present invention has various applications in fields as diverse as civil engineering, mining, erosion control, environmental and the manufacture of special materials. Ground improvement applications are particularly suited for the present invention Civil engineering applications include application of the method to retaining walls, embankments (e.g. railway embankments, dams) and ground for tunnelling to reinforce and stabilise soil; foundations to improve skin friction of piles (bonding them to the "far field"); increasing the end-bearing capacity of piles; stiffening in situ formation to reduce pile design lengths; improving the bearing capacity of soils for non-piled foundations; and the stabilisation of sands in earthquake zones at risk of liquefaction. The method of the present invention may further be used in pavements to create "instant" pavements by surface treatment of natural or prepared sand surfaces for roads, runways etc and to rapidly repair degraded pavement sub base.

The method of the present invention may also be used to preserve, restore, strengthen and protect Weathered mortar and masonry in buildings such as heritage structures; consolidate and conserve decaying lime plasters in mural paintings; create architectural features in gardens and replicate ornaments in synthetic sandstone/limestone.

Uses in the mining industry include the use of the method to provide support to broken ground during tunnelling and mining; strengthen tailings dams to prevent erosion and slope failure; provide a permeable reactive barrier to allow drainage and remove acidic and heavy metal discharges from mines; bind dust particles on exposed surfaces to reduce dust levels; increase resistance to petroleum borehole degradation during drilling and extraction; increase the resistance of offshore structures to erosion of sediment within or beneath gravity foundations and pipelines.

The method of the present invention also has environmental applications such as the stabilisation and removal of pollutants (e.g. heavy metals, fibres, radioactive elements) from the environment by binding them into the calcite crystal structures and the control of erosion in coastal area and rivers by strengthening exposed surfaces and thus protecting areas subject to erosion.

Other uses of the method include the creation of filters such as water filters and bore hole filters, and the immobilisation of bacterial cells and their enzymes into a cemented active biofilter.

Method of Producing High Strength Cement Products

The present invention provides a method of forming a high strength cement product, the method comprising combining a solid fraction with effective amounts of (i) a urease producing micro-organism; (ii) urea; and (iii) calcium ions.

The solid fraction can be any solid or plurality of solids that are suitable to be cemented together to form the high strength cement product. The solids may be rocks of various sizes. Alternatively, the solid may be a particulate material such as powdered rock or limestone that is adapted to be cemented together to form the cement product.

Preferably, the reactants are combined in a mould to produce cement products of a predetermined shape. These shapes can be varied and include blocks and the like that can be used for ornamental and structural applications.

General

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in the specification, individually or collectively and any and all combinations or any two or more of the steps or features.

The present invention is not to be limited in scope by the specific embodiments described herein, which are intended for the purpose of exemplification only. Functionally equivalent products, compositions and methods are clearly within the scope of the invention as described herein.

The entire disclosures of all publications (including patents, patent applications, journal articles, laboratory manuals, books, or other documents) cited herein are hereby incorporated by reference. No admission is made that any of the references constitute prior art or are part of the common general knowledge of those working in the field to which this invention relates.

Throughout this specification, unless the context requires otherwise, the word "comprise", or variations such as "comprises" or "comprising", will be understood to imply the inclusion of a stated integer or group of integers but not the exclusion of any other integer or group of integers.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

The present invention will now be described with reference to the following examples. The description of the examples in no way limits the generality of the preceding description.

EXAMPLES

General Material and Methods
(A) Culture of *S. pasteurii*
(i) Ammonium YE Cultivation
*S. pasteurii* was cultivated under batch conditions on 20 g/L yeast extract and 75 mM $(NH_4)_2SO_4$, pH adjusted before sterilisation to 9 with 4 M NaOH, at 28° C.
(ii) Urea YE Cultivation
Urea YE cultivation was conducted under batch conditions on 20 g/L yeast extract and 75 mM $CO(NH_2)_2$. Medium pH was 7.5 after autoclaving. Urea was added post-autoclaving by 0.2 μm filter sterilisation to prevent chemical decomposition under autoclave conditions.
(iii) Acetate YE Cultivation
Acetate YE cultivation was conducted under the same conditions as Ammonium YE cultivation, except the medium contained 10 g/L yeast extract, 100 mM $NaCH_3COO$ and 75 mM $(NH_4)_2SO_4$.
(B) Analytical Methods
(i) Urease Activity
The hydrolysis of urea liberates ionic products from non-ionic substrates according to the following equation:

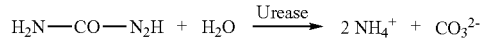

The rate of conductivity increase is proportional to the concentration of active urease present. Urease activity was determined over three minutes by calculating the slope of conductivity changes versus time, measured under standard conditions of 1.5 M urea at 25° C.

Figure 15:
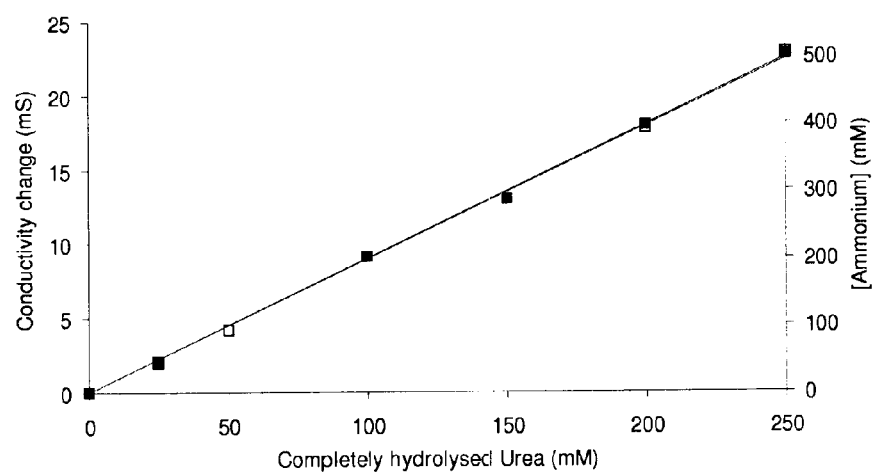
FIG. 15 is a graph of the standard curve of the conductivity change (■) and ammonium concentration (□) present after complete hydrolysis of urea.

The rate of conductivity increase (mS/min) was converted to urea hydrolysis rate (mM urea hydrolysed/min) by determining the conductivity change resulting from the complete hydrolysis of urea by commercially obtained purified urease from the same organism (Sigma Cat. No. U-7127) under standard conditions of 1.5 M urea at 25° C. A standard curve was generated (FIG. 15) and the amount of ammonium present at the end of hydrolysis was also determined to ensure that the reaction had gone to completion.

From figure the following relationships were determined:

Urea hydrolysed (mM)=Conductivity (mS)×11.11
($R2=0.9988$)

Urea hydrolysed (mM)=Ammonium (mM)×0.50
($R2=0.9991$)

(ii) Biomass Determination
Biomass was determined spectrophotometrically at 600 nm.
(iii) $NH_4$—N Analysis
Aonium concentration was determined spectrophotometrically by a modified Nessler Method. The sample was centrifuged at 13 500 rpm for 5 minutes to remove cells and the supernatant diluted to be in the range of 0-0.5 mM. 2 ml of the diluted sample was mixed with 100 μl of Nessler's reagent and allowed to react for exactly 1 minute before reading the absorbance at 425 nm.

Example 1

Biocementation in Si-Sand

Materials & Methods
(A) Application of Cementation Reactants into the Core
Cores for cementation consisted of 50 ml plastic syringes that were dry packed with 300 μm Si-sand under continuous vibration to give an even density. Cores were then up-flushed with water and tapped to remove air pockets. After flushing with water, the volume occupied by the sand decreased due to the lubrication effect between the sand particles and the stopper was adjusted to maintain a confining pressure.

Ca/urea solution and cells were premixed immediately before injection into the core by pouring both liquids into a single vessel and twice drawing and expelling the liquid with a second 50 ml syringe, to ensure proper mixing. One and a half times the pore volume was flushed in to ensure full displacement of water.

(B) In-situ Cementation Measurements
Strength was measured by sending ultrasound waves through the diameter of each core at three positions along the length (15, 45 and 75 mm from the injection end). Measurements were taken repeatedly over the course of the experiment. A higher degree of cohesion (cementation) will allow the sound wave to travel at a faster velocity (i.e. the faster the velocity—the greater the degree of cementation). Simultaneously, 1 ml samples were withdrawn from the cores through a capillary tube inserted down the side of the core to avoid ultrasound signal disruption. The samples were centrifuged at 13500 rpm to remove any suspended particles (sand or bacteria). The supernatant was then transferred to a clean tube and stored at −20° C. awaiting ammonium analysis.

Ultrasonic velocity can be measured in both saturated samples (wet velocity) and dry samples (dry velocity). For ultrasonic velocities measured in dry samples, the following relationship was determined for 0.300 mm passing silica sand:

$$\sigma = 1272 \times \exp\left(\frac{-14461}{v}\right)$$

Where:
σ=uniaxial compressive strength (MPa)
v=ultrasonic velocity (m.s$^{-1}$)
For ultrasonic velocities measured in saturated (wet) samples the above relationship can still be used after the measured wet velocity is converted into its equivalent dry velocity using the following relationship:

$v(dry)=v(wet)-600$ m.s$^{-1}$

Where:
v(dry)=dry ultrasonic velocity (m.s$^{-1}$),
v(wet)=wet ultrasonic velocity (m.s$^{-1}$).
(C) $NH_4$—N Analysis
Ammonium concentration was determined as described in the General Material and Methods section above.
(D) Effect of Enzyme Rate on Strength
Eight cores were treated with 1.5 M equimolar urea/calcium solutions (calcium supplied as 0.75M $Ca(NO_3)_2$ and 0.75 M $CaCl_2$) and cemented at various rates with different concentrations of urease (bacterial urease activity). Two flushes were performed and ultrasound measurements were taken at three positions (A, B and C) after 24 hours.

(E) Strength Development During the Course of Cementation

To investigate the strength development during the course of cementation, the velocities of four cores were continuously monitored over a 42 hour period, during which two applications of bacteria and reactants were applied. This allowed observation of strength changes as the reaction was proceeding.

The bacterial enzyme system was also compared to a soluble plant enzyme system. In order to elucidate the urea hydrolysis rate that produced the highest cementation strength, the change in strength per mM of urea hydrolysed was calculated and compared against the urea hydrolysis rate for each interval.

(F) Multiple Applications of Enzyme

The effect of multiple enzyme applications was quantified by applying the same amount of bacterial enzyme and reactants over two consecutive treatments. The production of ammonium was determined by the periodic removal of samples via a capillary tube inserted into the core. Between treatments, water was flushed through the core to remove any spent liquid. The second treatment was applied 24 hours after the first treatment and each treatment contained an applied enzyme activity of 11 mM urea.min$^{-1}$ and 1.5 M equimolar urea/Ca solution.

(G) Immobilisation of Enzyme and Re-Treatment with Reactants

To determine if residual urease activity present in the core after two cementation treatments could be reused, a third application was applied containing only calcium and urea reactants (without any additional enzyme).

Results (A) Effect of Enzyme Rate on Strength

The velocity measurements at the three positions (A, B and C) on each core were within ±10%, indicating that the degree of cementation along the core length was uniform. To obtain an overall core result, the velocities for the three positions were averaged (see FIG. 1). After one biocementation treatment, strength was observed to increase with increasing enzyme activities (see FIG. 1).

Figure 2:
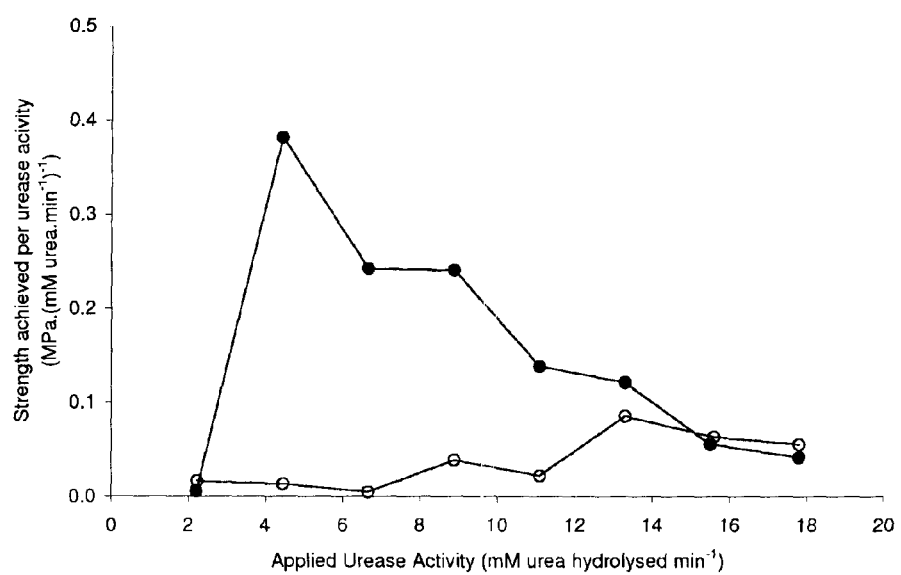
FIG. 2 is a graph illustrating the strength achieved per urease activity input for first (○) and second (●) biocementation treatments.

The improvement in strength relative to the amount of enzyme applied is illustrated in FIG. 2. The amount of strength was calculated by dividing by the amount of enzyme input into the system (e.g. if two applications of 4.4 mM urea.min$^{-1}$ produced a strength of 18 MPa, the strength improvement relative to enzyme input would be 18÷8.8=2.05 MPa.(mM urea.min$^{-1}$)$^{-1}$.

(B) Strength Development During the Course of Cementation

Figure 3:
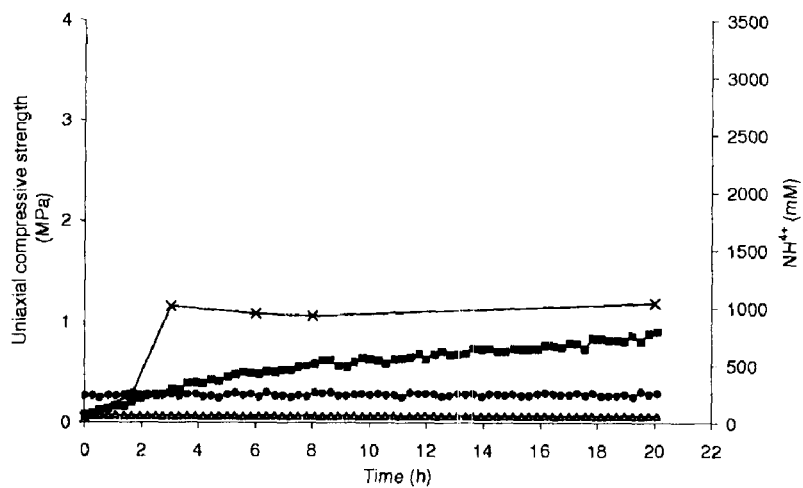
FIG. 3 is a graph illustrating the effect of different bacterial enzyme concentrations on strength development during cementation at three positions along core (15 mm (●); 45 mm (Δ) and 75 mm (■)) and concomitant production of ammonium from urea hydrolysis (×). Urease was applied as whole bacterial cells at 6 mM (A), 9 mM (B) and 12 mM (C) urea hydrolysed.min$^{-1}$.
Figure 3:
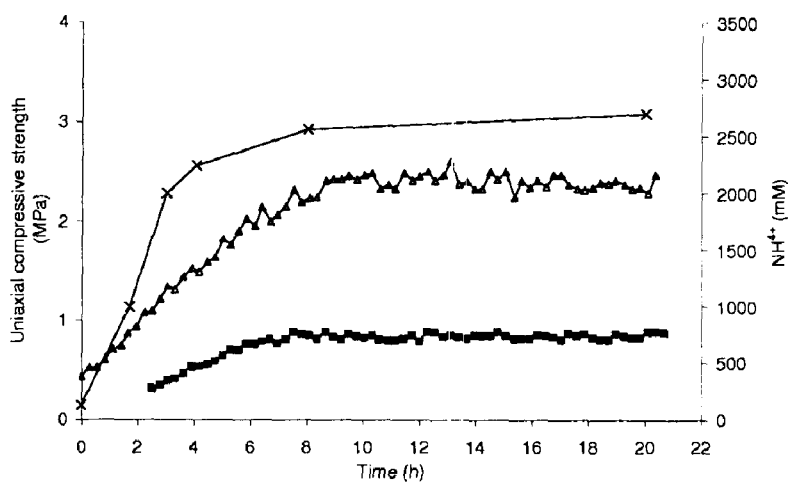
Figure 3:
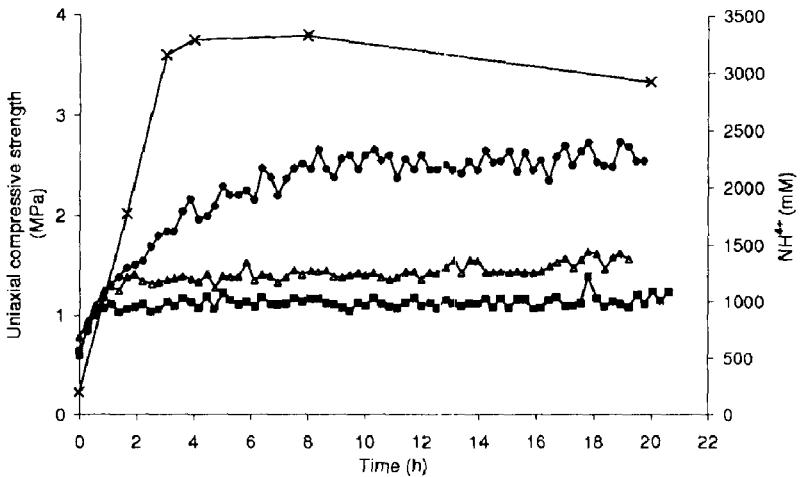

Data concerning strength development during the course of cementation are depicted in FIG. 3.

Figure 4:
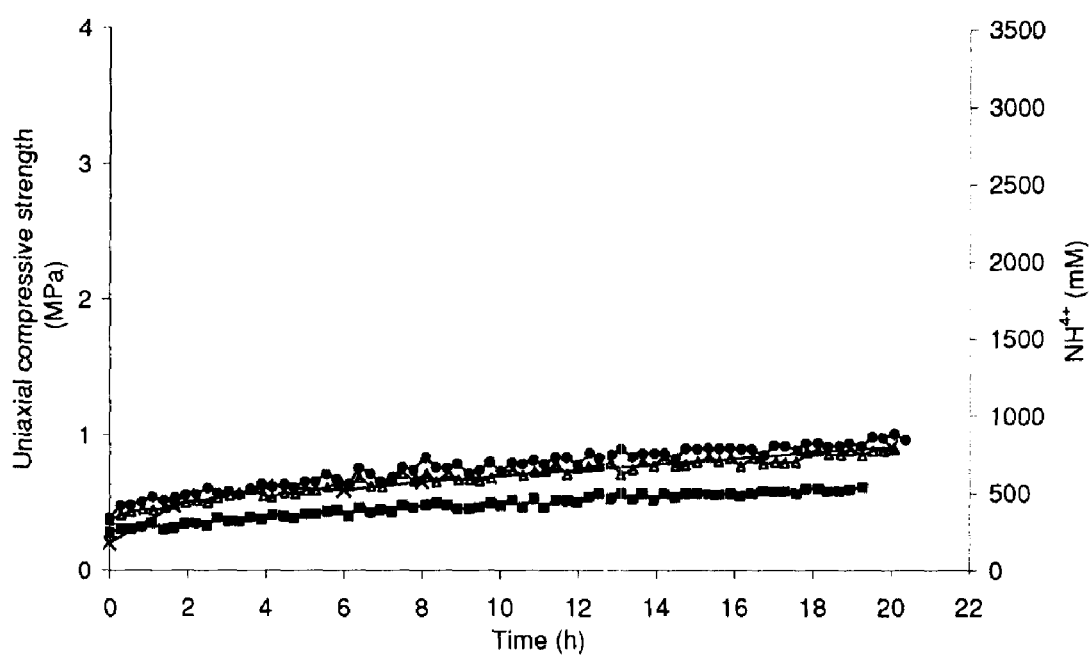
FIG. 4 is a graph illustrating the strength improvement over time using soluble plant enzyme (9 mM urea hydrolysed.min$^{-1}$) at three positions along the core length from the injection point (15 mm (●); 45 mm (Δ) and 75 mm (■)) and ammonium concentration (×) during the cementation reaction.
Figure 5:
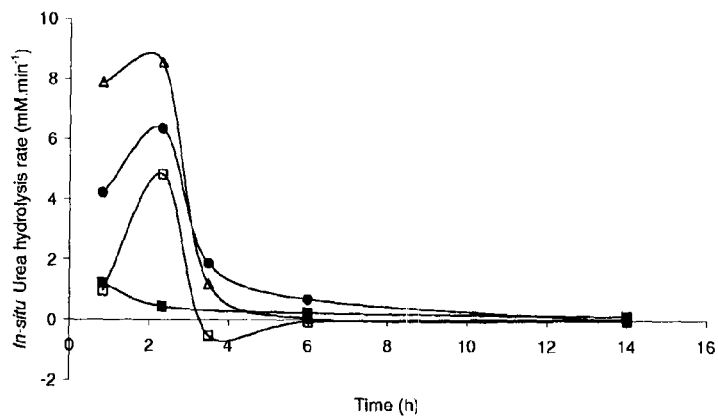
FIG. 5 is a graph illustrating the in-situ urea hydrolysis rate inside the core at different whole-cell bacterial urease activities: 6 mM (□), 9 mM (●) and 12 mM (Δ) urea hydrolysed.min$^{-1}$ and soluble plant enzyme: 9 mM urea hydrolysed.min$^{-1}$ (■)

The bacterial enzyme system showed a marked difference in the nature of velocity and strength improvement relative to the soluble plant enzyme system. (FIG. 4). Furthermore, the in-situ rate of ammonium production was significantly less in the soluble plant system compared to the same applied activity in the bacterial system (FIG. 5).

Figure 6:
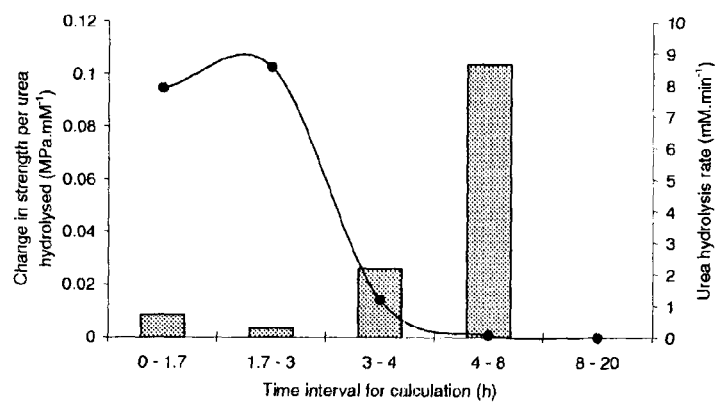
FIG. 6 is a graph illustrating the change in strength per urea hydrolysed (□) versus urea hydrolysis rate for each interval (●) for high activity core, 12 mm from the injection point.
Figure 7:
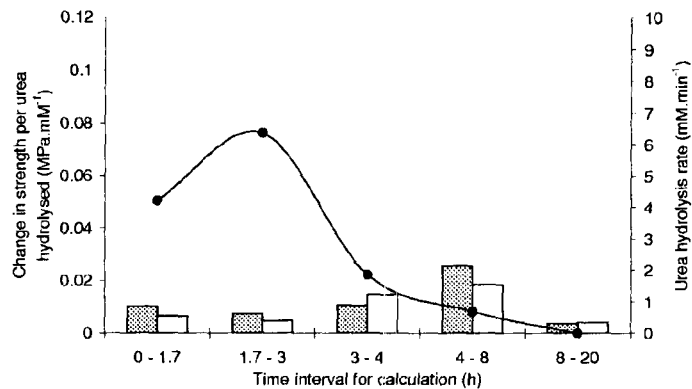
FIG. 7 is a graph illustrating the change in strength per urea hydrolysed at 45 mm (□) and 75 mm (□) from the injection point, versus urea hydrolysis rate for each interval (●) for medium activity core.

Data for the urea hydrolysis rate for the medium (9 mM urea.min$^{-1}$) and high (12 mM urea.min$^{-1}$) activity cores are in FIGS. 6 and 7.

(C) Multiple Applications of Enzyme

Figure 8:
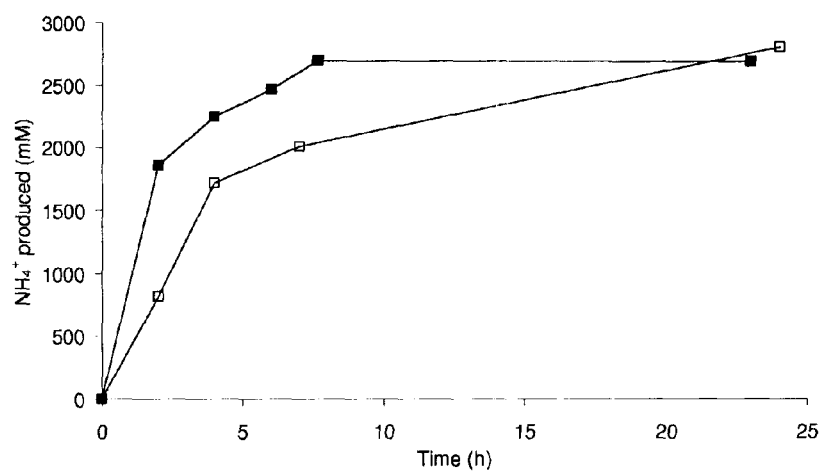
FIG. 8 is a graph illustrating the in-situ production of ammonium versus time for the first (□) and second (■) applications of enzyme and reactants inside a sand core. Both applications contained an applied enzyme activity of 11 mM urea hydrolysed.min$^{-1}$ under standard conditions.

During the initial hours of cementation, the first treatment maintained an ammonium production rate of 7.2 mM $NH_4^+$.min$^{-1}$, which relates to 3.6 mM urea hydrolysed.min$^{-1}$. The initial urea hydrolysis rate in the second application was double this rate (7.8 mM urea/min$^{-1}$), indicating that bacterial urease activity from the first treatment was still active in the second (see FIG. 8). The higher level of activity in the second treatment resulted in earlier completion of the reaction.

(D) Immobilisation of Enzyme and Re-Treatment with Reactants

Figure 9:
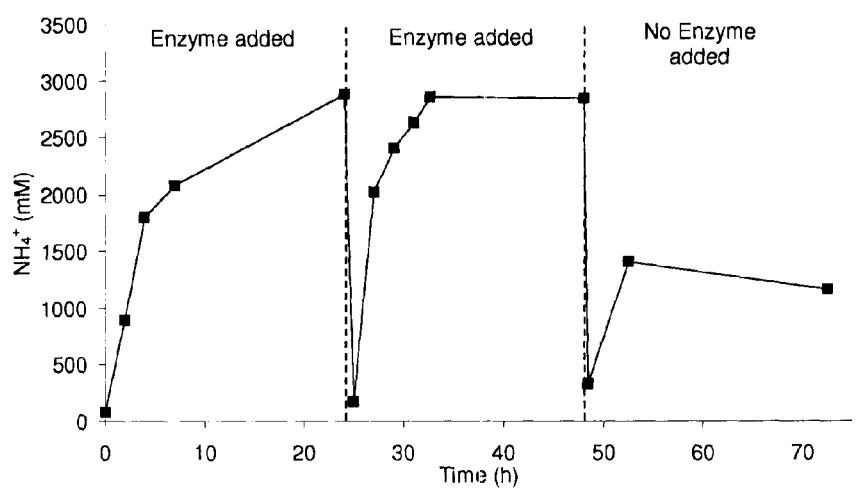
FIG. 9 is a graph illustrating the residual urease activity immobilised in a core after two previous applications of enzyme and reactants.

Even though no additional enzyme was added, approximately 1M of ammonium was produced in 4 hours (4.5 mM ammonium produced.min$^{-1}$), which related to an average urease activity of 2.25 mM urea hydrolysed.min$^{-1}$ (see FIG. 9). The residual enzyme in the core was only active for the first few hours after application with no further ammonium production beyond 4 hours.

Example 2

Biocementation in Other Sands

Materials & Methods (A) Vegemite Acetate Medium

Vegemite acetate medium consisted of 13.5 g.L$^{-1}$ Vegemite, from which the solids were removed by gravity settling followed by decanting the upper fraction and 150 mM acetate added as glacial acetic acid. The pH was adjusted to 7 with 6 M NaOH.

For the inoculum cultivation, the medium was sterilised and 10 g.L$^{-1}$ urea was added by sterile filtration, post-sterilisation. For the pilot-scale cultivation, the medium was not sterilised and urea was added without sterile filtration.

(B) 10 L Pilot-Scale Inoculum Cultivation

A pilot-scale inoculum was grown under sterile conditions in a 10 L stirred tank reactor (Chemap, Germany), at 30° C. with a starting pH of 8.25.

(C) 100 L Pilot-Scale Cultivation

The pilot-scale cultivation was conducted under non-sterile conditions in a 120 L custom-built fibreglass airlift reactor (courtesy of Andrew Brown & Co., Perth), with a working volume of 100 L.

The vessel was temperature controlled to 30° C., with a starting pH of 8.15.

(D) Urease Activity and Biomass

Urease activity, specific urease activity and biomass were calculated as described in the General Material and Methods section (E) Cementation Cementation trials were conducted in either <300 μm silica sand (i.e. all sand particles less than 300 μm), a commercial Dutch construction sand containing some shale (Koolschijn) or a 9 parts Koolschijn sand to 1 part Peat mix as indicated for each experiment (Koolschijn and peat supplied by GeoDelft, The Netherlands).

Figure 10:
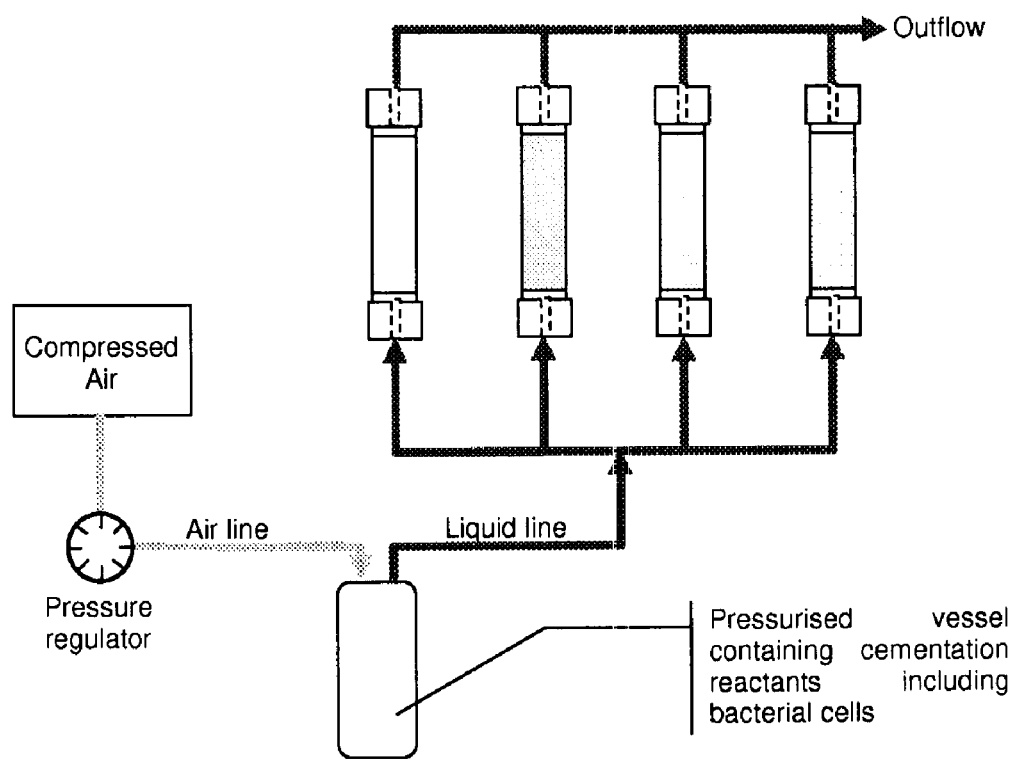
FIG. 10 is a schematic illustration of the method for injecting cementation liquid into sand cores.

The sand was dry packed with continuous vibration, to give an even density of approximately 1.75 g.cm$^3$ for sand cores or 1.65 g.cm$^3$ for sand/peat cores, into 38 (internal diameter)× 170 mm PVC pipe columns. Cores were then up-flushed with water and tapped to remove air pockets. Ca/urea solution and enzyme were premixed immediately before injection into the core via a pressurised vessel (see FIG. 10). The cementation reactants (calcium/urea solutions and bacterial cells) were immediately mixed and put into the vessel that was closed and pressurised using compressed air. The liquid line was then opened to allow the cementation solution to up-flush through the sand cores. After the cores were fully saturated, the liquid line was closed and cementation solution remained in cores for 24 hours. Up to four cores were treated at once.

One and a half times the pore volume (void volume) was flushed in to ensure full displacement of water. Between cementation flushes, water was flushed through the cores to remove any spent liquid and the number of cementation flushes for each core is indicated for each experiment. Post-cementation, cores were flushed with a bleach solution and oven-dried at 60° C.

(F) Urease Preparation

A 10 L stirred tank reactor was used to produce a suitable inoculum for the 100 L pilot-scale reactor. *S. pasteurii* was cultivated under sterile conditions on Vegemite acetate medium.

Five litres of the inoculum were transferred from the inoculum cultivation (above) to the pilot-scale airlift reactor (5% inoculum) and cultivated under non-sterile conditions on Vegemite acetate medium. Previous experiments had indicated that *S. pasteurii* could be cultivated under non-sterile conditions with up to 50% contamination, without affecting the level of urease activity. The pilot-scale cultivation was conducted under non-sterile 'clean' conditions, which involved washing the interior of the reactor immediately prior to inoculation, with a 5% hypochlorite solution and rinsing well with water. The maximum urease activity was approximately 6 mM urea hydrolysed.min$^{-1}$.

(G) Determination of Strength Properties After Biocementation

Cementation of Koolschijn sand was carried out using a urease activity of 8.75 mM urea.min$^{-1}$ from cells cultivated in Vegemite acetate and ammonium medium and injected into the core at 15 psi.

Samples were prepared using either Koolschijn sand (K) or 90% Koolschijn plus 10% peat mix (w/w) (KP) and treated with 2, 3 or 4 biocementation treatments.

After cementation, the strength properties of the cores were investigated by triaxial testing, and shear strength and stiffness were determined. Triaxial testing is a compression test of a cylindrical rock sample under confining pressure where the loading path is followed by a computer. This test aimed to simulate the conditions that may occur to in-situ rock material where it is subjected to a confining pressure and deviatoric stress. Before the triaxial shearing phase, samples were flushed with $CO_2$ to remove any non-water soluble gases and saturated with water. Stiffness was determined using Young's modulus at 50% of peak stress and shear strength was determined at 50% of the maximum deviator stress.

Shear strength is a measure of how much stress (force÷area) can be applied before the material undergoes shear failure (the situation whereby the soil can no longer sustain increases in the applied load without excessive deformations and stress re-distribution resulting). Stiffness is the ratio between stress and strain at 50% shear strength, and gives an estimate of the force required to give a certain level of displacement.

To determine the degree of pore volume reduction after cementation the pore volume after treatment was compared to that of unconsolidated sand. Permeability tests were conducted using a 30 cm head difference, 300 kPa back pressure and a consolidation pressure of 100 kPa.

Results (A) Biocementation

Figure 11:
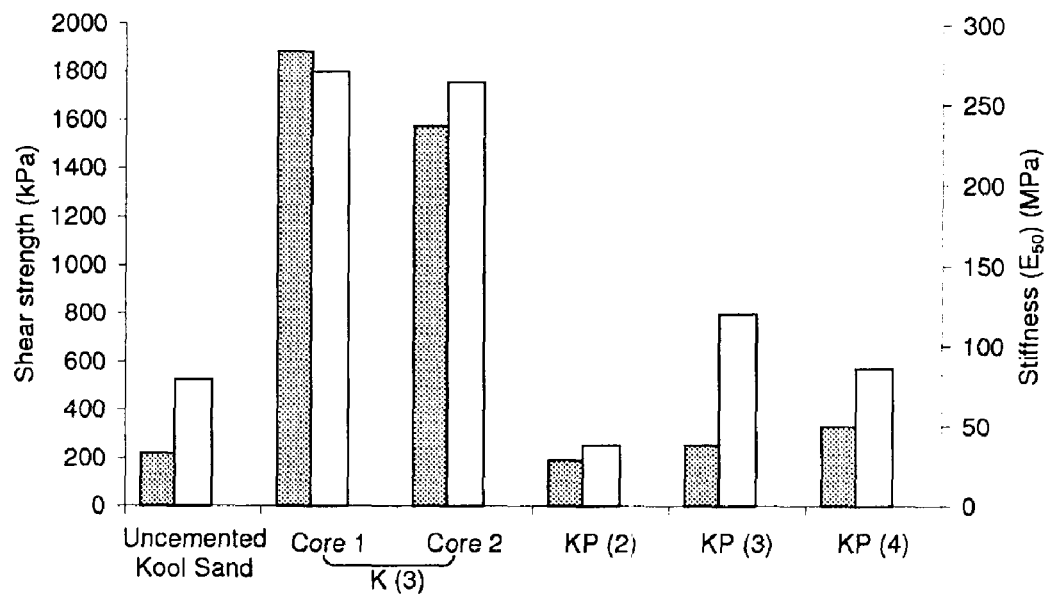
FIG. 11 is a graph illustrating the shear strength (□) and stiffness (□) in Koolschijn sand (K) and Koolschijn sand mixed with 10% peat (KP) after biocementation treatments (Number of treatments are indicated in brackets)

Koolschijn sand subjected to biocementation had a clear improvement on strength and stiffness, with an average increase in shear strength by a factor of 8, and increase in stiffness by a factor of 3 (FIG. 11).

The Koolschijn/peat samples (KP) were clearly different, showing less strength and less stiffness compared to K sand. Two biocementation treatments in KP sand showed no improvement compared to uncemented K sand. However, it should be noted that the strength properties of uncemented KP sand was not determined and may have been lower. Increasing the number of applications in KP sand improved shear strength (FIG. 11).

Figure 12:
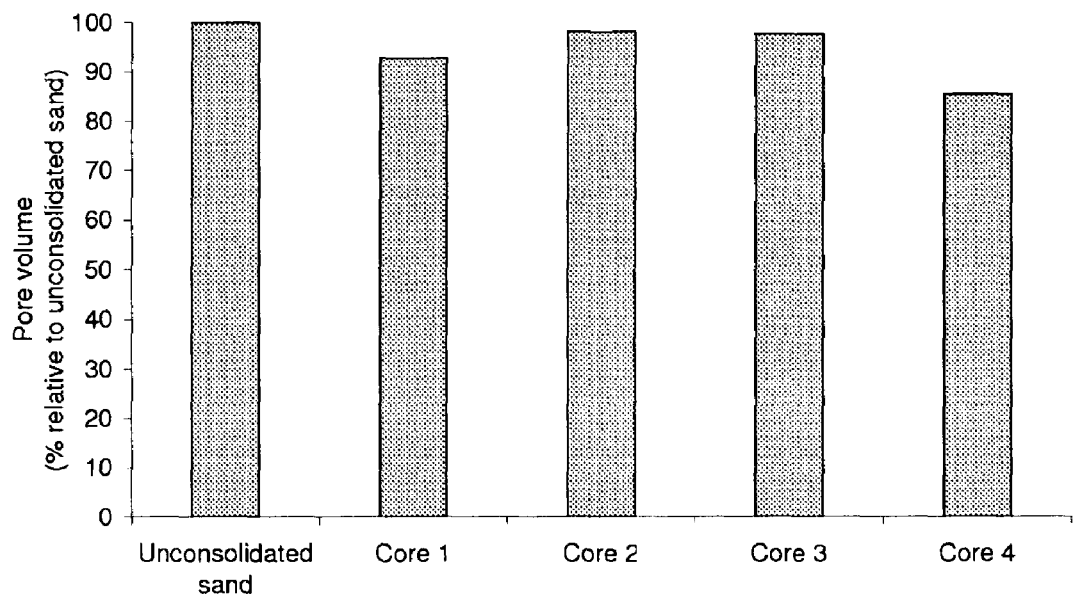
FIG. 12 is a graph illustrating the difference in pore volume before and after treatment of Koolschijn sand with three biocementation treatments.

Pore volume was decreased between 2 and 14%, representing a minor reduction after cementation, thus leaving the permeability of the core largely unchanged (FIG. 12).

Example 3

Enhancing Penetration Depth for Biocementation

Materials/Methods

Bacteria were cultured in the presence of 6 mM $Ca^{2+}$ and then 650 mL of the bacterial culture (urease activity approximately 10 mM urea hydrolysed/min) was applied to a 1 m sand column by up-flushing under a pressure of 7.5 psi for 11:39 min (1.4 L/hr). The column with the bacterial cells inside was kept at room temperature for a period of 48 hours after which 1.25M $Ca^{2+}$ and 1.7M urea was up-flushed into the column.

Results

Figure 13:
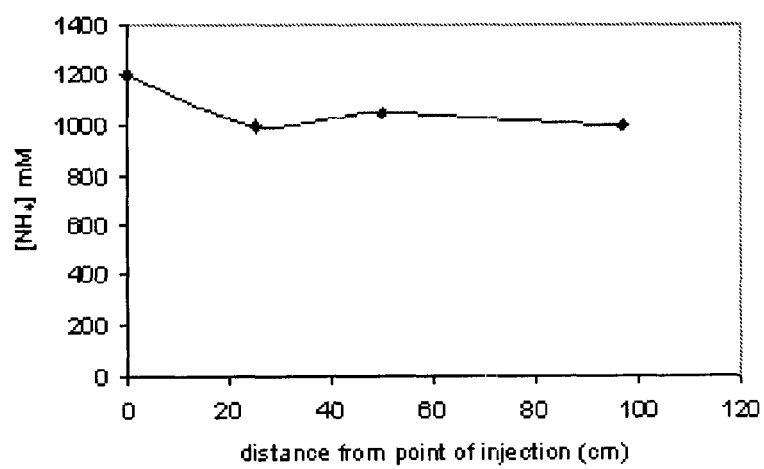
FIG. 13 is a graph of the $NH_4^+$ analysis for samples collected from different distances along the sequentially cemented column.
Figure 14A:
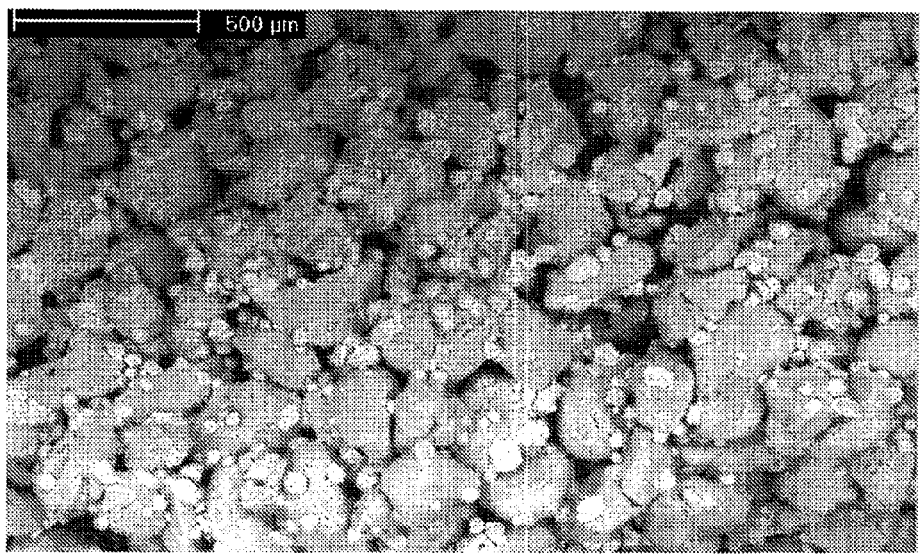
FIG. 14a and b are photographs at different magnifications of a column cemented using a preferred embodiment of the present invention.
Figure 14B:
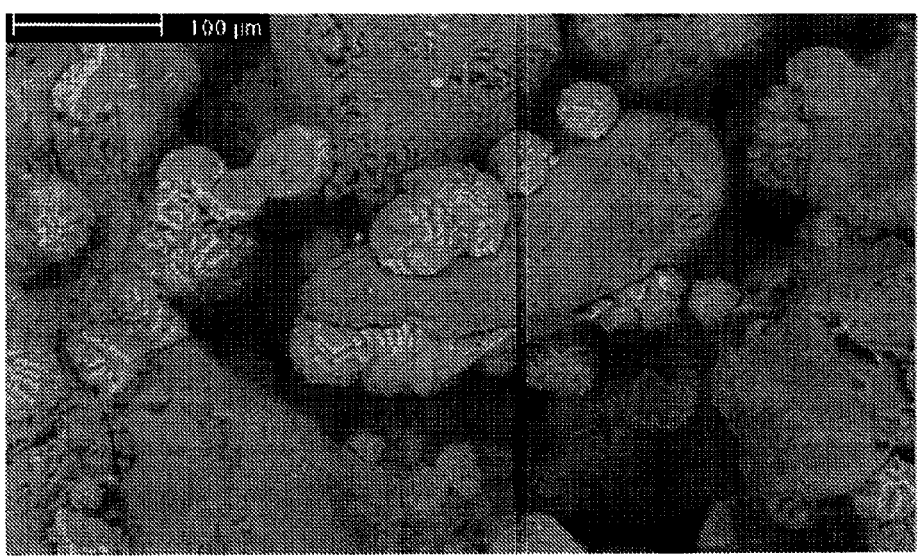

A uniform strength was obtained. The uniformity of the cemented column was confirmed by ammonium analysis see FIG. 13. Two photographs of the columns after cementation are attached as FIGS. 14A and 14B.

Example 4

Fixing (Immobilising) Bacteria for Biocementation

Materials/Methods 6 mM calcium was added to the growth medium of bacteria for use in biocementation and the retention of the bacteria on sand columns was assessed after flushing the columns.

Results

Addition of 6 mM calcium to the growth medium increased the "stickiness" of the bacterial strain used. The bacteria were flushed into the column for more than 1 m and over 50% of the bacteria were retained in the column following a second flush. When bacteria were cultured in the absence of calcium over 80% of the bacteria were lost from the column after the second flush.

This technique allows for the amount of urease activity applied to a starting material to be closely controlled and also minimizes the loss of bacteria from methods involving more than one application of reagents.

Example 5

Biocementation in Silica Sand with Immobilized Bacteria

An example of Biocementation of silica sand with particular application to soil stabilisation in sandy soils is described below.

Materials/Methods

A 60 ml PVC cylinder of 29 mm internal diameter was dry packed with 0.300 mm passing washed $SiO_2$ sand. The urease active bacterial culture (*Bacillus pasteurii*) was grown under shaking in 1 L shake flasks in a medium containing 0.3 M urea and 6 mM $CaCl_2$ for 24 hours at 28° C.

The urease activity of the cells was 5.6 mM urea hydrolysed per min, as measured by the change in conductivity of about 0.5 mS min$^{-1}$. This level of bacterial urease activity is sufficient to produce strong and rapid cementation in the sand without the need to concentrate the cells, hence avoiding a potentially costly further processing step of concentrating the bacteria.

Using a slow-flow peristaltic pump (pump rate of 15 mL per minute) the culture including the bacterial cells was up-flushed through the cylinder until 3 void volumes of bacterial suspension were pumped through. Excessive liquid containing some bacteria was allowed to flow out at the top of the cylinder. The remainder of the bacterial suspension was kept in the column for about 48 hours. This attachment time allowed to bacteria to attach to the sand particles avoiding them from being flushed out with the subsequent flush of calcium/urea solution.

An equi-molar solution containing calcium chloride and Urea (both at 1 M concentrations) was up-flushed using the same peristaltic pump, until a volume equalling 1.3 times the void volume of the cylinder had been applied. After 24 hours of incubation at room temperature a second application of the same calcium chloride/Urea solution was flushed through the cylinder to form further Calcite crystals. This second flush can be omitted if less strength is desired.

Results

The cemented cylindrical sample of silica sand was removed from the PVC cylinder and its unconfined compressive strength measured. The measured unconfined compressive strength was 1.7 MPa.

The claims defining the invention are as follows:

1. A method of forming a high strength cement in a permeable starting material, wherein the permeable starting material is an unconsolidated or partially unconsolidated particulate material, the method comprising the step of combining the starting material with effective amounts of (i) a urease producing micro-organism; (ii) urea; and (iii) calcium ions and wherein the effective amount of the urease producing organism provides a urea hydrolysis rate, under standard conditions, of 0.5-50 mM urea hydrolysed.min$^{-1}$.

2. A method of forming a high strength cement in a permeable starting material, wherein the permeable starting material is an unconsolidated or partially unconsolidated particulate material, the method comprising the step of combining the starting material with effective amounts of (i) a urease producing micro-organism; (ii) urea; and (iii) calcium ions and wherein the cement results from the formation of at least 22 g of calcite per litre of material added to the starting material.

3. A method according to claim 1 or 2 wherein at least two of the (i) a urease producing micro-organism; (ii) urea; and (iii) calcium ions are admixed prior to being combined with the starting material.

4. A method according to claim 1 or 2 wherein the starting material is combined with the effective amount of a urease producing micro-organism prior to addition of the urea and calcium ions.

5. A method according to claim 4 wherein the micro-organism is fixed in the starting material prior to adding the urea and calcium ions.

6. A method according to claim 4 wherein the micro-organism is fixed in the starting material by contacting the micro-organism with about 3-8 mM calcium ions prior to adding the urea and calcium ions required to form the high strength cement.

7. A method according to claim 1 or 2 wherein the micro-organism is contacted with at least 38 mM calcium ions prior to combining the micro-organism with the starting material and with the urea and calcium ions required to form the high strength cement.

8. A method of forming a high strength cement in a permeable starting material, wherein the permeable starting material is an unconsolidated or partially unconsolidated particulate material, the method comprising the steps of:
    combining the starting material with effective amounts of (i) a urease producing micro-organism; (ii) urea; and (iii) calcium ions; and
    adding further amounts of at least one of the reactants (i) to (iii);
    wherein the effective amount of the urease producing organism provides a urea hydrolysis rate, under standard conditions, of 0.5-50 mM urea hydrolysed.min$^{-1}$.

9. A method according to claim 8 wherein step of adding further amounts of at least one of the reactants (i) to (iii) comprises the addition of further amounts of urea and the calcium ions.

10. A method according to any one of claim 1, 2 or 8 wherein the effective amount of urea is to a final concentration of at least 100 mM.

11. A method according to any one of claim 1, 2 or 8 wherein the effective amount of calcium ions is to a final concentration of at least 100 mM.

12. A method according to any one of claim 1, 2 or 8 wherein the calcium ions are provided in the form of a salt.

13. A method according to claim 12 wherein the calcium ions are provided as calcium nitrate and/or calcium chloride.

14. A method according to any one of claim 1, 2 or 8 wherein the micro-organism is a bacterium belonging to the Bacillacae family.

15. A method according to any one of claim 1, 2 or 8 wherein the micro-organism is adapted to survive and/or grow under at least one of the following conditions: (i) urea concentrations of 350-2000mM; (ii) calcium ion concentrations of 50-2000 mM; (iii) pH's of at least 7.5-10; and (iv) temperatures of at least 30° C.

16. A method according to any one of claim 1, 2 or 8 wherein the starting material has a particulate structure.

17. A method according to claim 16 where in the starting material comprises rock or stone.

18. An in situ method according to any one of claims 1, 2 or 8.

19. A method according to any one of claim 1, 2 or 8 wherein the starting material and reagents are combined by a technique selected from the group consisting of: flushing, injecting; spraying, dripping or trickling onto or into the starting material and immersion.

20. A cement formed by a method according to any one of claim 1, 2 or 8.

21. A cement according to claim 20 that contains bacterial cells and has a strength of at least 0.05-5MPa.

* * * * *